United States Patent
Fitch, Jr. et al.

[11] Patent Number: 6,032,610
[45] Date of Patent: Mar. 7, 2000

[54] APPARATUS FOR DISPENSING A QUANTITY OF MATERIAL ON A SHELL

[75] Inventors: Clifford E. Fitch, Jr., R.R. #2, Box 74C, Beecher, Ill. 60401; James N. Egan, Mount Prospect, Ill.

[73] Assignee: Clifford E. Fitch, Jr., South Holland, Ill.

[21] Appl. No.: 09/025,698

[22] Filed: Feb. 18, 1998

[51] Int. Cl.[7] .................................................. A23G 3/00
[52] U.S. Cl. ............................... 118/13; 118/16; 118/24; 118/314; 118/324; 99/450.1; 99/450.7; 99/494
[58] Field of Search ............................... 118/13, 16, 24, 118/27, 314, 324; 426/289, 292; 99/450.1, 450.7, 494; 222/56; 366/342, 343, 326.1, 308

[56] References Cited

U.S. PATENT DOCUMENTS

| | | | |
|---|---|---|---|
| 1,994,797 | 3/1935 | Thomas | 177/108 |
| 2,715,878 | 8/1955 | Egerton | 99/450.7 |
| 3,193,029 | 7/1965 | Harvison et al. | 177/120 |
| 3,241,625 | 3/1966 | Soojian | 177/120 |
| 3,368,501 | 2/1968 | Kuhlman | 99/450.7 |
| 3,522,854 | 8/1970 | Liedtke | 177/119 |
| 3,525,374 | 8/1970 | Fitch et al. | 376/406 |
| 3,633,450 | 1/1972 | Grote | 99/450.1 |
| 3,633,489 | 1/1972 | Spoelhof et al. | 99/450.1 |
| 3,682,106 | 8/1972 | Kuhlman | 99/450.7 |
| 3,725,974 | 4/1973 | Kuhlman | 99/450.1 |
| 3,760,715 | 9/1973 | Grote et al. | 99/450.1 |
| 3,779,205 | 12/1973 | Kuhlman | 118/24 |
| 3,780,643 | 12/1973 | Papai | 99/450.7 |
| 3,858,545 | 1/1975 | Fischer et al. | 118/13 |
| 3,908,584 | 9/1975 | Raque | 118/16 |
| 3,943,601 | 3/1976 | Kuhlman | 425/441 |
| 3,945,448 | 3/1976 | Sellers | 177/25.19 |
| 3,980,235 | 9/1976 | Kuhlman | 241/84 |
| 4,060,027 | 11/1977 | Jenny | 99/450.1 |
| 4,068,570 | 1/1978 | Lanoie | 99/353 |
| 4,112,834 | 9/1978 | Thiry | 99/450.1 |
| 4,152,976 | 5/1979 | Kawasaki et al. | 99/450.1 |
| 4,202,260 | 5/1980 | Weger | 99/450.4 |
| 4,225,001 | 9/1980 | Gillenkirch | 177/90 |
| 4,230,007 | 10/1980 | Grote et al. | 83/409.2 |
| 4,248,173 | 2/1981 | Kuhlman | 118/20 |
| 4,264,634 | 4/1981 | Hochandel et al. | 426/287 |
| 4,395,427 | 7/1983 | Fischer et al. | 426/231 |
| 4,438,686 | 3/1984 | Perez | 99/353 |
| 4,771,726 | 9/1988 | Fitch, Jr. | 118/25 |
| 4,778,365 | 10/1988 | Archer | 425/73 |
| 4,801,097 | 1/1989 | Fitch, Jr. | 241/34 |

(List continued on next page.)

OTHER PUBLICATIONS

Computerized QC system streamlines weight checking (undated).
Problem–Solving Ideas "On line weighing system slashes inventories, speeds processing" (undated).
Electronic scales measure up on filling, assembly lines (undated).
Computer feedback on line (undated).
Computerized scale system cuts give–away, waste (undated).

*Primary Examiner*—Laura Edwards
*Attorney, Agent, or Firm*—Wallenstein & Wagner, Ltd

[57] ABSTRACT

A food material dispensing apparatus for adding a topping to a target food is described. The apparatus comprises a first hopper and a first food distributing system. The first hopper is adapted for receiving the food material at an inlet and delivering the food material through an outlet toward a target location. The first food distributing system is designed for spreading the food material over the target food. The food distributing system includes a motor positioned a horizontal distance from the inlet of the first hopper, a curved conduit, and a flexible, rotary shaft. The curved conduit has a proximal end and a distal end. The proximal end is releaseably connected to the motor, and the distal end is adapted for insertion into the hopper. The flexible, rotary shaft is for stirring and/or mixing the food material. The flexible, rotary shaft passing through the curved conduit and is operatively connected at a first end to the motor.

20 Claims, 6 Drawing Sheets

U.S. PATENT DOCUMENTS

| | | | |
|---|---|---|---|
| 4,832,961 | 5/1989 | Aoki | 425/239 |
| 4,839,185 | 6/1989 | Gram | 426/512 |
| 4,850,845 | 7/1989 | Hicks | 425/289 |
| 4,960,025 | 10/1990 | Fitch, Jr. | 83/703 |
| 5,012,726 | 5/1991 | Fehr et al. | 99/450.6 |
| 5,043,391 | 8/1991 | DeMars et al. | 525/279 |
| 5,121,677 | 6/1992 | LeClaire et al. | 99/357 |
| 5,171,367 | 12/1992 | Fitch, Jr. | 118/25 |
| 5,458,055 | 10/1995 | Fitch, Jr. | 99/450.1 |
| 5,523,101 | 6/1996 | Fitch, Jr. | 426/289 |
| 5,678,476 | 10/1997 | Sanders | 118/27 |

6,032,610

APPARATUS FOR DISPENSING A QUANTITY OF MATERIAL ON A SHELL

TECHNICAL FIELD

The present invention relates generally to automated dispensing devices, and, more particularly to an apparatus for applying cheese to individual pizza shells, such as at a high volume producer of frozen pizzas.

BACKGROUND

Pizza making is generally a labor intensive undertaking. Pizza crusts or shells are produced from a dough substance, seasoned tomato sauce is added and spread evenly over the shell, and other toppings such as cheese, meats, and vegetables are added according to personal taste. In many situations, it is advantageous to produce pizzas as fast as possible. This is the case in the manufacture of frozen pizzas.

It is simply not cost effective to manually produce individual frozen pizzas. In order for the manufacturer to achieve a suitable profit margin, frozen pizzas must be produced rapidly with as little human intervention as possible. Manufacturers have incorporated many different devices in the pizza making operation to automate certain tasks. Chief among these tasks is the addition of toppings. For instance, U.S. Pat. No. 3,525,374 describes an automated pizza meat dispenser; U.S. Pat. No. 4,771,726 describes a an automated device for adding a flowable material, such as pizza sauce, to a food target; U.S. Pat. No. 4,801,097 describes a food ingredient dispensing device; U.S. Pat. No. 5,171,367 describes an apparatus for applying pizza sauce to a pizza; and, U.S.

Pat. No. 5,523,101 describes a multi-purpose applicator.

It is also important for the different automated dispensers to operate as efficiently and quickly as possible. Therefore, it is advantageous to design a dispenser which functions continuously or does not pause to add the toppings to the shell.

Furthermore, it is important to spread the toppings evenly over the shell. If the toppings are not spread evenly over the shell, the pizza will become unbalanced, and it will have an awkward appearance and perhaps cook unevenly. Therefore, an automated dispenser must spread the toppings uniformly over the shell.

Therefore, there is a need for a continuous apparatus for adding a food material to a shell for use in the pizza making industry described herein.

SUMMARY OF THE INVENTION

The present invention is directed toward a food material dispensing apparatus for adding a topping to a target food. The apparatus comprises a first hopper and a first food material distributing system. The first hopper is adapted for receiving the food material at an inlet and delivering the food material through an outlet toward a target location. The inlet generally has a larger cross-sectional area than the outlet so that the hopper has a funnel-like structure for directing the food material toward a concentrated area.

The first food distributing system is for spreading the food material over the target food. The food distributing system includes a motor, a curved conduit and a flexible, rotary shaft. The motor is positioned near the inlet of the hopper and at a horizontal distance from the hopper. A proximal end of the curved conduit is releaseably connected to the motor. The curved conduit is adapted to enter the interior of the hopper near the inlet so that a distal end of the curved conduit is positioned near the hopper's outlet.

The flexible, rotary shaft has a first end and a second end. The first end is operatively connected to the motor so that the motor transfers a rotary motion to the flexible, rotary shaft. The flexible, rotary shaft passes through the curved conduit so that the second end is positioned near the distal end of the curved conduit.

Other features and advantages of the invention will be apparent from the following specification taken in conjunction with the following drawing.

DETAILED DESCRIPTION

Figure 1:
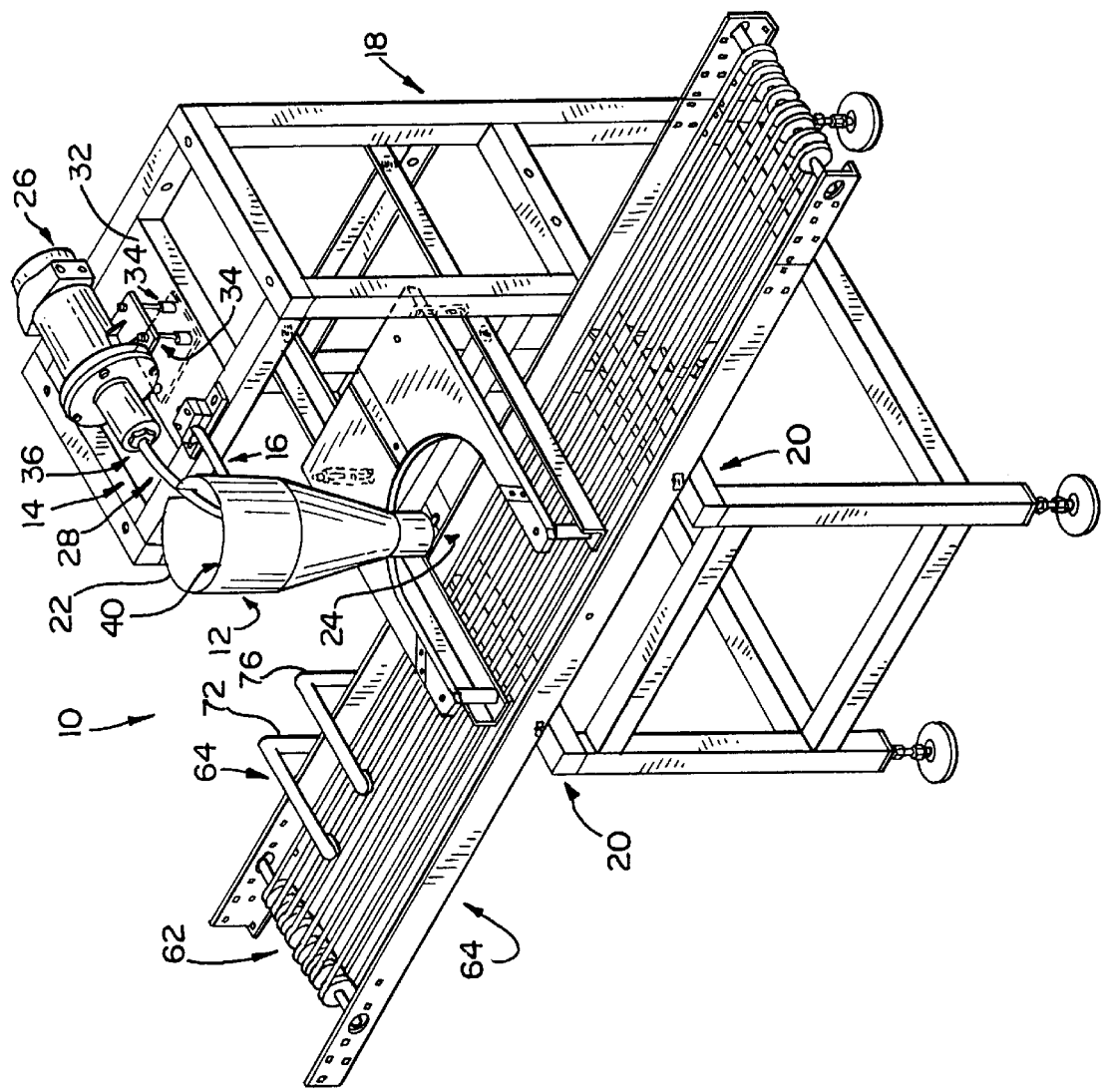
FIG. 1 is a perspective view of an apparatus for dispensing a quantity of material on a shell.
Figure 2:
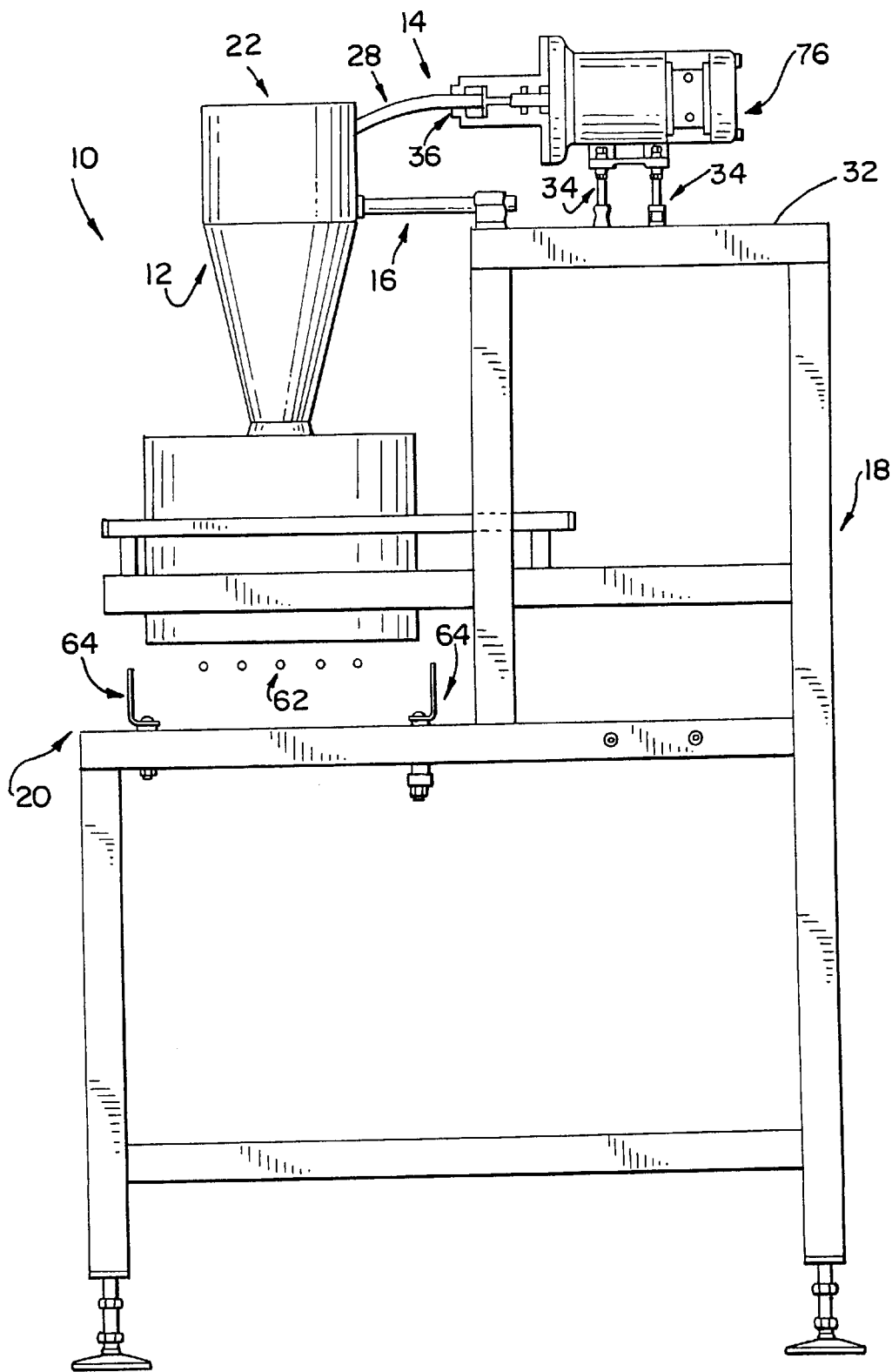
FIG. 2 is a side view of an apparatus for dispensing a quantity of material on a shell.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 is a perspective view of a food material dispensing apparatus 10 of the present invention. The food material dispensing apparatus dispenses a food material to a plurality of target locations. The target locations can be a target food of a type that requires additional toppings. In the preferred embodiment, the target foods are pizza shells or crusts used in the frozen pizza field and the food material is a cheese topping. The dispensing apparatus comprises a hopper 12 and a food distributing system 14.

Figure 3:
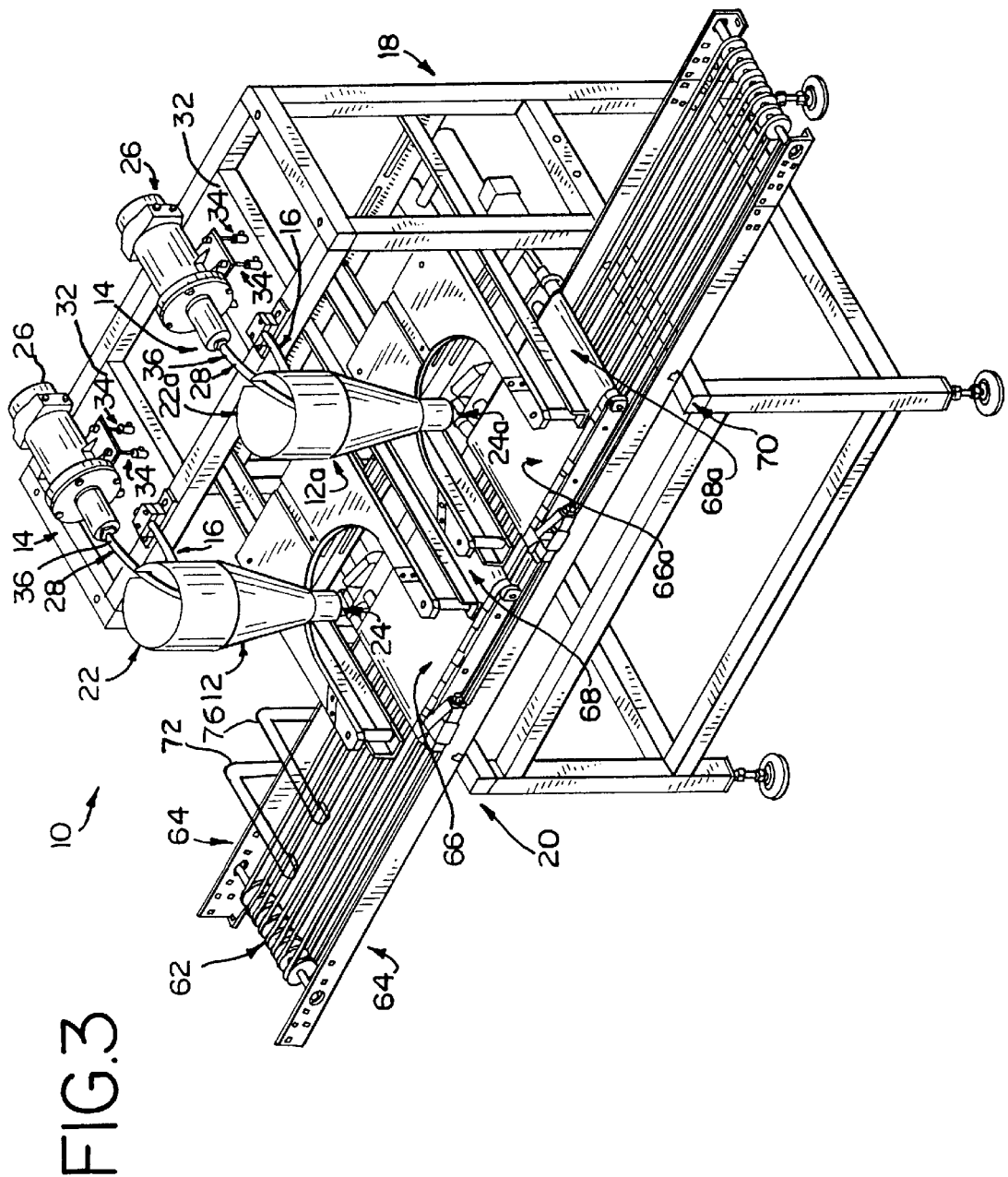
FIG. 3 is a perspective view of an apparatus for dispensing a quantity of material on a shell.
Figure 4:
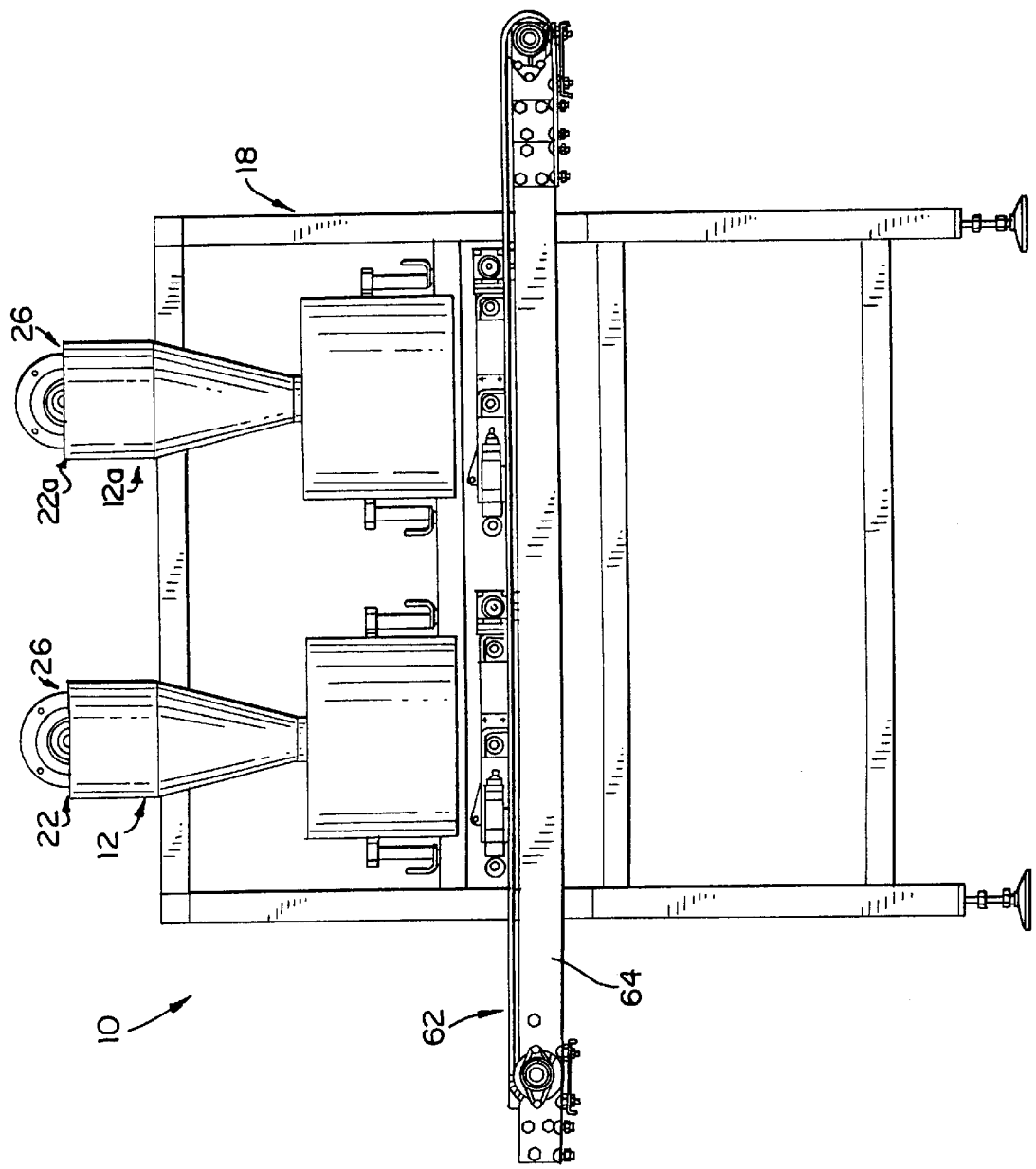
FIG. 4 is a front view of an apparatus for dispensing a quantity of material on a shell.
Figure 5:
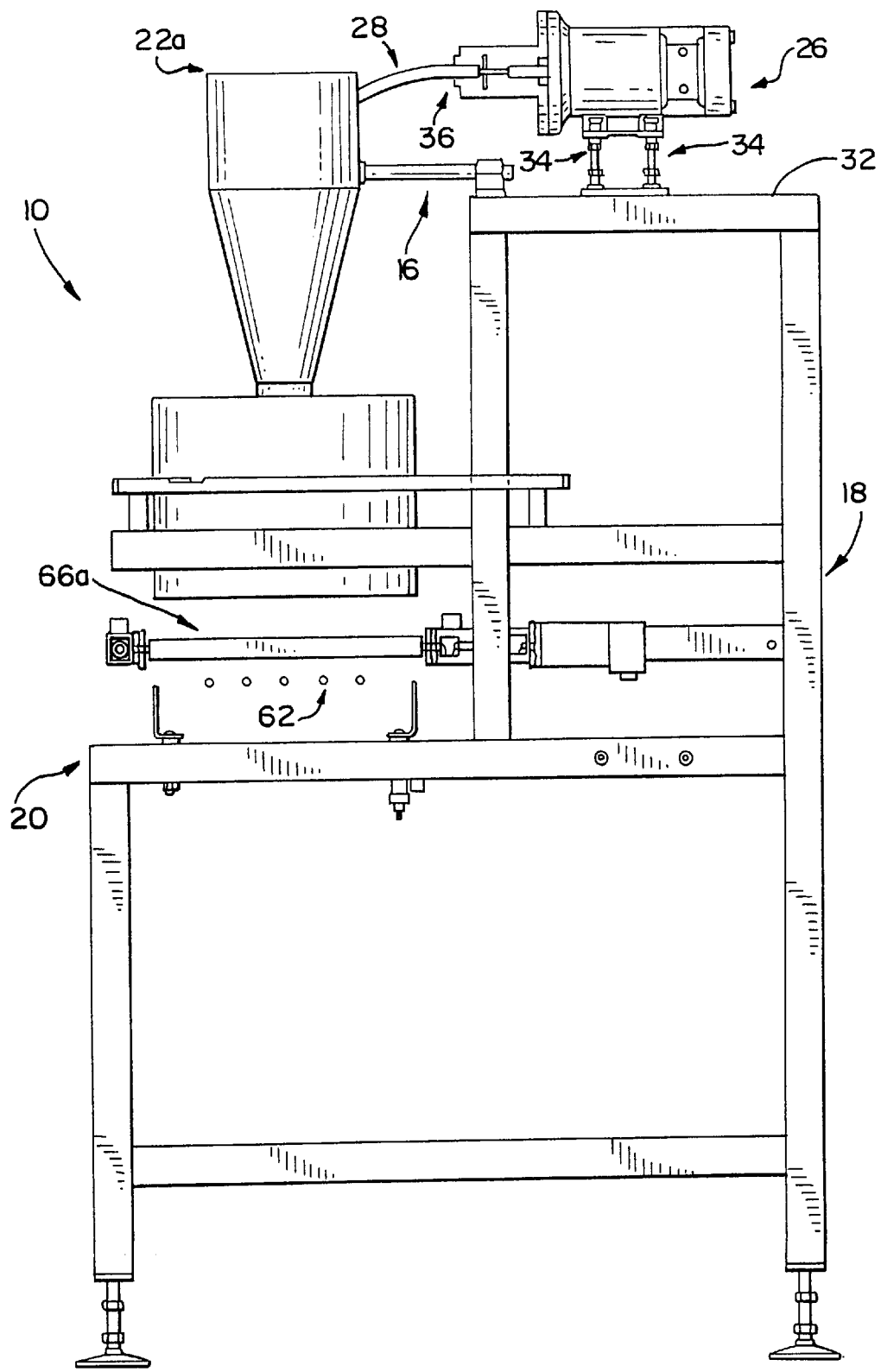
FIG. 5 is a side view of an apparatus for dispensing a quantity of material on a shell.

In the preferred embodiment shown in FIG. 4, the food material dispensing apparatus 10 delivers food material to a plurality of continuously moving food targets. The food material dispensing apparatus 10 of FIG. 3 comprises a plurality of hoppers 12. In this preferred embodiment, there are first and second hoppers 12, 12a. The first and second hoppers 12, 12a are linearly aligned.

The first and second hoppers 12, 12a are substantially identical. Each hopper 12 is supported by a beam member 16 within a frame 18 so that the hoppers 12, 12a are suspended and vertically displaced above supporting portions 20 of the frame 18. The hoppers 12, 12a have inlets 22, 22a for accepting a predetermined amount of topping and outlets 24, 24a through which the topping passes toward the target location. The inlets 22, 22a have a larger cross-sectional area than that of the outlets 24, 24a so that the hoppers 12, 12a have a funnel-like shape for directing the topping to a concentrated area.

Figure 6:
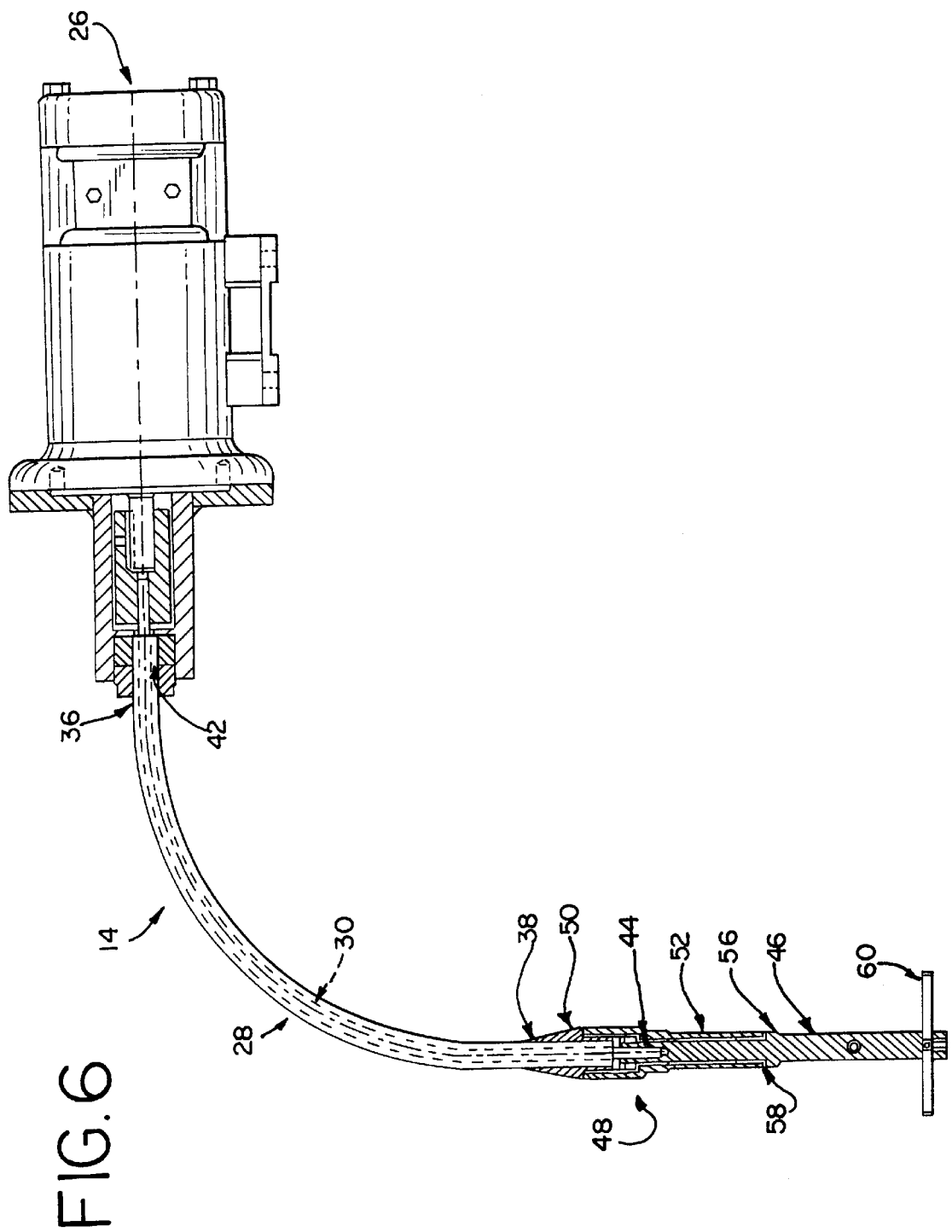
FIG. 6 is a side view of a food distributing system.

Each hopper 12 is equipped with a food distributing system 14. Referring to FIG. 6, the food distributing systems 14 comprise a motor 26, a curved conduit 28, and a flexible, rotary shaft 30. The motors 26 are positioned at approximately the same height as the inlet 22 of each hopper 12. Rather than being positioned directly above the hoppers 12, the motors 26 are displaced at a horizontal distance from the inlets 22 of the hoppers 12. Each motor 26 is supported on the frame 18 by a platform 32 to which the motors 26 are fixedly attached by a plurality of bolts 34 or other suitable attaching means. (See FIG. 3).

Each curved conduit 28 is attached to one of the motors 26. The curved conduits 28 are preferably produced from stainless steel tubing. A proximal end 36 of each curved conduit 28 is attached to the motor 26. A distal end 38 of each curved conduit 28 is inserted into the hopper 12. Thus, the curved conduits 28 extend from the motors 26 to the inlets 22, enter an interior portion 40 of the hoppers 12, and extend downwardly toward the hopper outlets 24. At the proximal ends 36, the curved conduits 28 are designed to be detachable from the motors 26 for easy cleaning and maintenance.

The flexible, rotary shafts 30 extend from the motor 26 through the curved conduit 28 into the hoppers 12. The flexible, rotary shafts 30 are operatively connected at first ends 42 to the motors 26. Second ends 44 of the flexible, rotary shafts 30 are positioned substantially adjacent the distal ends 38 of the curved conduits 28. First and second stirring shafts 46 are operatively connected to the second ends 44 of the flexible, rotary shafts 30. The stirring shafts 46 are produced from a rigid material and adapted for stirring and/or mixing the food material.

Collars 48 are fitted around the distal ends 38 of the curved conduits 28 for preventing the food material from entering the curved conduits 28. Each collar 48 has first and second interlocking parts 50, 52. The first part 50 engages the curved conduit 28. The second part 52 extends down the length of the stirring shaft 46 and engages an abutment 56 on the stirring shaft 46 to form a seal 58 which prevents the food material from entering the curved conduit 28.

First and second distributing blades 60 are operatively connected to the first and second stirring shafts 46, respectively. The motors 26 turn the flexible, rotary shafts 30, the stirring shafts 46, and the distributing blades 60 cooperating to mix the food material and evenly distribute a predetermined amount of the food material over the target locations.

In one embodiment the target locations, are top portions of the food targets. This embodiment is illustrated in FIG. 1. In FIG. 1, a conveyor belt 62 transports the target foods under the hopper 12. The conveyor belt 62 passes over the supporting portions 20 of the frame 18 and are routed through this region by angle iron guides 64 which are fastened to the supporting portions 20 of the frame 18. In operation, the conveyor belt 62 of this embodiment comes to a stop under the hopper 12 where the food material is distributed over the top of the target food by the food distributing system 14.

As illustrated in FIG. 4, in the preferred embodiment, the food material dispensing apparatus 10 further comprises a plurality of transfer belts 66. Most preferably, there are first and second transfer belts 66, 66a. The transfer belts 66, 66a operate as the target locations for receiving the food material from the first and second hoppers 12, 12a. Accordingly, the transfer belts 66, 66a are positioned below the outlets 24, 24a of the hoppers 12, 12a. The transfer belts 66, 66a have a shorter length than the conveyor belt 62.

In operation, the first hopper 12 delivers the predetermined amount of food material to the first transfer belt 66. The first transfer belt 66 is stationary as it receives food material from the first hopper 12. The first transfer belt 66 then begins to traverse in the same direction as the conveyor belt 62. The first transfer belt 66 carries the food material toward a first delivery end 68. The speed of the first transfer belt 66 is synchronized with the speed of the conveyor belt 62. As the food material reaches the first delivery end 68, the food material is gravitationally delivered to the target food positioned on the conveyor belt 62 below. The first and second hoppers 12, 12a act in conjunction with the first and second transfer belts 66 to deliver food material to a plurality of continuously moving target foods. In other words, as the separate target foods enter the apparatus 10 the first separate target food receives food material from the first transfer belt 66 and the second separate target food receives food material from the second transfer belt 66a, and, although the transfer belts 66, 66a stop to receive food material from the hoppers 12, 12a, the conveyor belt 62 does not need to stop.

The food dispensing apparatus 10 further comprises a means for determining the location of the target food on the conveyor belt 62 and a means for synchronizing the relative positions of the hopper 12 and the target location so that the food material is delivered in an accurate and precise manner to the target food. It is contemplated that a first photoeye 72 is used to determine the actual size of the target food. The information gathered by the first photoeye 72 is communicated to a controller. A second photoeye 76 senses the leading edge of target food, so that the controller, using the size information from the first photoeye, can regulate how far the conveyor belt 62 needs to traverse to place the target food directly under the outlet 24 of the hopper 12.

In the preferred embodiment, the second photoeye 76 senses the leading edge of the target food. The controller, using the size information from the first photoeye 72, can synchronize the speed of one of the transfer belts 66, 66a with the speed of conveyor belt 62, so that the food material is delivered approximately to the center of the target food.

While specific embodiments have been illustrated and described, numerous modifications are possible without departing from the spirit of the invention, and the scope of protection is only limited by the scope of the accompanying claims.

What is claimed is:

1. A food material dispensing apparatus for adding a topping to a target food, comprising:

a first hopper for receiving the food material at an inlet and delivering the food material through an outlet toward a target location; and a first food distributing system for spreading the food material over the target food, the food distributing system including a motor positioned a horizontal distance from the inlet of the first hopper, a curved conduit having a proximal end and a distal end, the proximal end releaseably connected to the motor and the distal end for insertion into the hopper, and a flexible, rotary shaft for stirring the food material, the flexible, rotary shaft passing through the curved conduit and operatively connected at a first end to the motor.

2. The food material dispensing apparatus of claim 1 wherein the first food distributing includes a stirring shaft operatively connected to a second end of the flexible, rotary shaft.

3. The food material dispensing apparatus of claim 2 wherein a collar is fitted around the distal end of the curved conduit for preventing the food material from entering the conduit.

4. The food material dispensing apparatus of claim 3 wherein the collar comprises interlocking first and second parts, the second part extending down a length of the stirring shaft and in communication with an abutment on the stirring shaft.

5. The food material dispensing apparatus of claim 4 wherein a distributing blade for evenly spreading the food material over the target location is operatively connected to the stirring shaft.

6. The food material dispensing apparatus of claim 1 further comprising a conveyor belt for transporting the target food toward the first hopper.

7. The food material dispensing apparatus of claim 1 wherein the target location is a transfer belt of shorter length than the conveyor belt and positioned in vertical alignment with the conveyor belt wherein the food material is deposited on the transfer belt which delivers the food material to the target food located on the conveyor belt.

8. The food material dispensing apparatus of claim 1 further comprising a second hopper and a second food distributing system.

9. The food material dispensing apparatus of claim 1 further comprising means for determining the location of the target food and means for synchronizing the relative positions of the hopper and the target location wherein the food material is delivered in an accurate and precise manner to the target food.

10. The food material dispensing apparatus of claim 9 wherein the means for determining the location of the target food on the conveyor belt is a photoeye.

11. A continuous food material dispensing apparatus for adding a topping to a plurality of target foods, comprising:
 a first and second hopper, each hopper for receiving the food material at an inlet and delivering the food material through an outlet toward a plurality of target locations; and
 a first and a second curved conduit, each conduit having a proximal end and a distal end, the proximal ends releaseably connected to first and second motors, respectively, and the distal ends for insertion into the first and second hoppers, respectively, and a first flexible, rotary shaft and a second flexible, rotary shaft for stirring the food material, the flexible, rotary shafts passing through the first and second conduits, respectively and operatively connected at first ends to the motors.

12. The food material dispensing apparatus of claim 11 wherein first and second stirring shafts for mixing the food material are operatively connected to a second end of the first and second flexible, rotary shafts, respectively.

13. The food material dispensing apparatus of claim 12 wherein first and second distributing blades for evenly distributing the food material over the target locations are connected to the stirring shaft.

14. The food material dispensing apparatus of claim 13 wherein first and second collars for preventing the food material from entering the first and second conduits are fitted around the distal ends of the first and second conduits.

15. The food material dispensing apparatus of claim 14 wherein the first and second collars comprise interlocking first and second parts, the second parts extending down the length of the first and second stirring shafts and in communication with an abutment on the stirring shafts.

16. The food material dispensing apparatus of claim 13 further comprising a conveyor belt for transporting the target foods toward the first and second hoppers.

17. The food material dispensing apparatus of claim 16 wherein the target locations are located atop first and second transfer belts positioned in vertical alignment with the conveyor belt wherein the food material is deposited on the transfer belts which deliver the food material to the plurality of target foods.

18. The food material dispensing apparatus of claim 11 further comprising means for determining the location of the target food and means for synchronizing the relative positions of the hopper and the target location wherein the food material is delivered in an accurate and precise manner to the target food.

19. The food material dispensing apparatus of claim 18 wherein the means for determining the location of the target food on the conveyor belt is a photoeye.

20. A continuous food material dispensing apparatus for adding a topping to a plurality of target foods, comprising:
 a first and a second hopper, each hopper for receiving the food material at an inlet and delivering a predetermined amount of the food material through an outlet toward a plurality of target locations of predetermined size;
 a first and a second motor, each motor positioned at a distance from the first and second hoppers;
 a first and a second curved conduit, each conduit having a proximal end and a distal end, the proximal ends releaseably connected to the first and second motors and the distal ends for insertion into the first and second hoppers, respectively, and a first and a second flexible, rotary shaft for stirring the food material, the flexible, rotary shafts passing through the first and second conduits, respectively, and operatively connected at first ends to the first and second motors, respectively;
 a first and a second stirring shaft for mixing the food material, each stirring shaft operatively connected to a second end of each flexible, rotary shaft;
 a first distributing blade and a second distributing blade for evenly distributing the predetermined amount of food material over the food targets connected to the first and second stirring shafts, respectively;
 a conveyor belt for transporting the target foods toward the first and second hoppers;
 means for predetermining the size of each target food positioned on the conveyor belt;
 means for predetermining the amount of food material needed to cover each food target in communication with the means for predetermining the size of the target food; and
 a first transfer belt and a second transfer belt, each transfer belt positioned in vertical alignment with the conveyor belt wherein the predetermined amount of food material is deposited from the hoppers onto the transfer belts which continuously deliver the food material to the plurality of target foods located on the conveyor belt.

* * * * *